(12) United States Patent
Fini et al.

(10) Patent No.: US 12,164,160 B2
(45) Date of Patent: Dec. 10, 2024

(54) MITIGATION OF POLARIZATION IMPAIRMENTS IN OPTICAL FIBER LINK

(71) Applicant: Ayar Labs, Inc., Santa Clara, CA (US)

(72) Inventors: John Fini, Albany, CA (US); Chen Sun, Berkeley, CA (US)

(73) Assignee: Ayar Labs, Inc., San Jose, CA (US)

( * ) Notice: Subject to any disclaimer, the term of this patent is extended or adjusted under 35 U.S.C. 154(b) by 199 days.

(21) Appl. No.: 17/524,697

(22) Filed: Nov. 11, 2021

(65) Prior Publication Data

US 2022/0155538 A1 May 19, 2022

Related U.S. Application Data

(60) Provisional application No. 63/113,193, filed on Nov. 13, 2020.

(51) Int. Cl.
*G02B 6/42* (2006.01)
*H04B 10/2569* (2013.01)

(52) U.S. Cl.
CPC ......... *G02B 6/4216* (2013.01); *G02B 6/4246* (2013.01); *H04B 10/2569* (2013.01)

(58) Field of Classification Search
CPC .. G02B 6/4216; G02B 6/4218; G02B 6/4246; H04B 10/2569
See application file for complete search history.

(56) References Cited

U.S. PATENT DOCUMENTS

| 6,721,469 | B2 | 4/2004 | Kopp et al. | |
|---|---|---|---|---|
| 9,829,651 | B2 * | 11/2017 | Hall | G02B 6/40 |
| 10,330,875 | B2 | 6/2019 | Fini et al. | |
| 10,724,922 | B1 * | 7/2020 | Yao | G02B 6/024 |

(Continued)

FOREIGN PATENT DOCUMENTS

| EP | 1251647 A1 * | 10/2002 | ........... G02B 6/2932 |
|---|---|---|---|
| WO | WO00/16139 A2 | 3/2000 | |

(Continued)

OTHER PUBLICATIONS

PCT Application No. PCT/US21/59153, International Search Report and Written Opinion, Mailed on Apr. 13, 2022.

*Primary Examiner* — Balram T Parbadia
*Assistant Examiner* — Mary A El-Shammaa
(74) *Attorney, Agent, or Firm* — Penilla IP, APC

(57) ABSTRACT

An optical data communication system includes an optical transmitter and an optical receiver. A polarization-maintaining optical data communication link extends from an optical output of the optical transmitter to an optical input of the optical receiver. The polarization-maintaining optical data communication link includes at least two sections of polarization-maintaining optical fiber optically connected through an optical connector. The at least two sections of polarization-maintaining optical fiber have different lengths. The optical connector is configured to optically align a fast polarization axis of a first polarization-maintaining optical fiber to a slow polarization axis of a second polarization-maintaining optical fiber. The optical connector is also configured to optically align a slow polarization axis of the first polarization-maintaining optical fiber to a fast polarization axis of the second polarization-maintaining optical fiber.

19 Claims, 6 Drawing Sheets

(56) References Cited

U.S. PATENT DOCUMENTS

2003/0223689 A1* 12/2003 Koch ................ H04B 10/2572
                                                          385/11
2015/0138630 A1    5/2015 Honea et al.
2016/0191172 A1*  6/2016 Masarik ................ F16M 13/04
                                                          361/679.01
2019/0261478 A1*  8/2019 Kober ................ H05B 45/395

FOREIGN PATENT DOCUMENTS

WO    WO-2008122289 A2 * 10/2008    ......... H01S 3/06704
WO    WO-2019023015 A1 *  1/2019    ............. H01S 3/005

* cited by examiner

MITIGATION OF POLARIZATION IMPAIRMENTS IN OPTICAL FIBER LINK

CLAIM OF PRIORITY

This application claims priority under 35 U.S.C. 119(e) to U.S. Provisional Patent Application No. 63/113,193, filed on Nov. 13, 2020, the disclosure of which is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for modulating optical signals and for receiving optical signals.

The vast majority of fiber-optic communication links use optical fiber that is not polarization-maintaining. Typical components (e.g., optical fibers, optical detectors) making up commercial fiber-optic communication systems are sufficiently polarization insensitive to provide for efficient data communication while allowing the polarization in the optical fiber link to vary randomly and without control. However, some integrated optical devices can more efficiently process light received through an optical fiber when the polarization of the light in the optical fiber is controlled. It is within this context that the present invention arises.

SUMMARY

In an example embodiment, an optical data communication system is disclosed. The optical data communication system includes an optical transmitter, an optical receiver, and a polarization-maintaining optical data communication link extending from an optical output of the optical transmitter to an optical input of the optical receiver. The polarization-maintaining optical data communication link includes at least two sections of polarization-maintaining optical fiber optically connected through an optical connector. The at least two sections of polarization-maintaining optical fiber have different lengths.

In an example embodiment, an optical data communication system is disclosed. The optical data communication system includes a polarization-maintaining optical data communication link that includes a first polarization-maintaining optical fiber optically coupled to a second polarization-maintaining optical fiber, such that a fast polarization axis of the first polarization-maintaining optical fiber is aligned with a slow polarization axis of the second polarization-maintaining optical fiber, and such that a slow polarization axis of the first polarization-maintaining optical fiber is aligned with to a fast polarization axis of the second polarization-maintaining optical fiber.

In an example embodiment, a method is disclosed for operating an optical data communication system. The method includes transmitting optical signals from an output of an optical transmitter through a polarization-maintaining optical data communication link to an optical input of an optical receiver, where the polarization-maintaining optical data communication link includes at least two sections of polarization-maintaining optical fiber optically connected through an optical connector. The at least two sections of polarization-maintaining optical fiber have different lengths.

In an example embodiment, a method is disclosed for operating an optical data communication system. The method includes transmitting optical signals through a polarization-maintaining optical data communication link including a first polarization-maintaining optical fiber optically coupled to a second polarization-maintaining optical fiber. The first polarization-maintaining optical fiber is optically coupled to the second polarization-maintaining optical fiber such that a fast polarization axis of the first polarization-maintaining optical fiber is aligned with a slow polarization axis of the second polarization-maintaining optical fiber, and such that a slow polarization axis of the first polarization-maintaining optical fiber is aligned with to a fast polarization axis of the second polarization-maintaining optical fiber.

Other aspects and advantages of the invention will become more apparent from the following detailed description, taken in conjunction with the accompanying drawings, illustrating by way of example the present invention.

DETAILED DESCRIPTION

Figure 1:
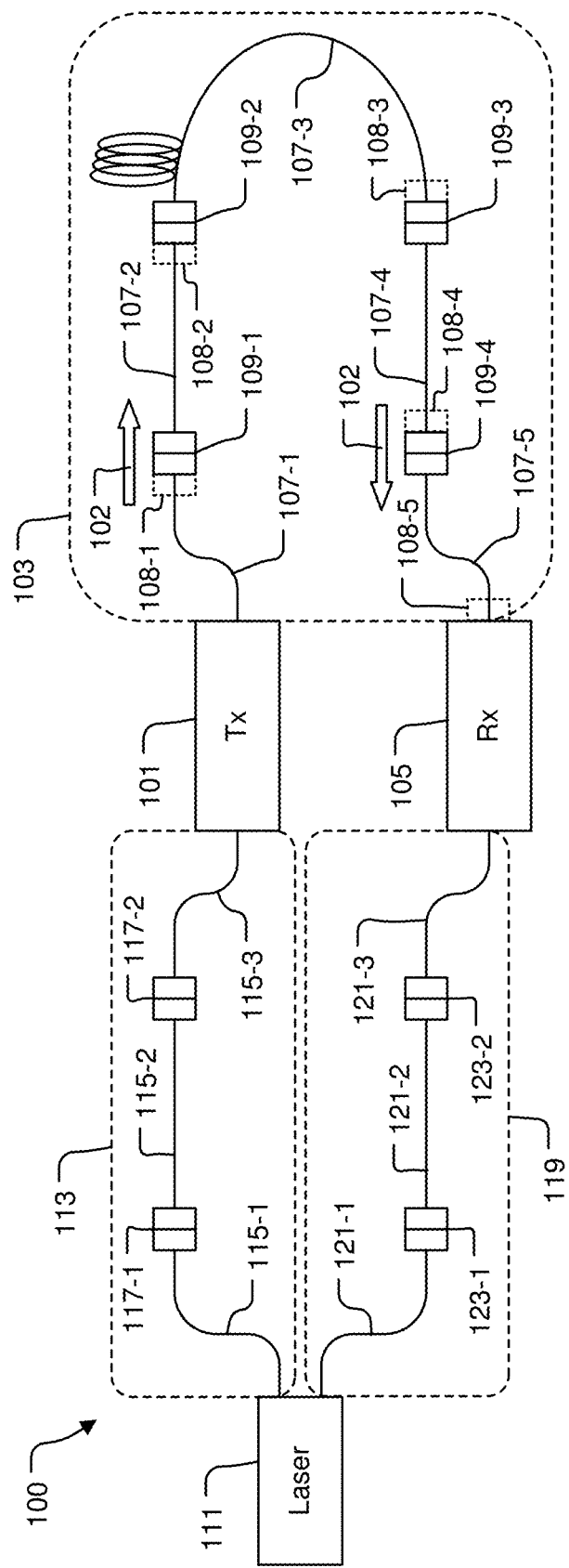
FIG. 1 shows a diagram of an optical data communication system that includes an optical transmitter optically connected through a polarization-maintaining optical data communication link to an optical receiver, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Optical data communication systems operate by modulating laser light to encode digital data patterns within the electrical domain as modulated light signals within the optical domain. The modulated light signals are transmitted through optical fibers to an electro-optic receiver where the modulated light signals are detected and decoded to obtain the original encoded digital data patterns back in the electrical domain. In many optical data communication systems, a polarization state of the light within the optical fiber is not controlled, and may be perturbed by small movements of the optical fiber and/or changes in ambient temperature while the system is operating. In these systems, an integrated optical device, e.g., an electro-optic receiver, among other devices, has to handle incoming light signals that have an arbitrary polarization that varies over time. Therefore, in some embodiments, it is desirable to use polarization-maintaining (PM) optical links, e.g., optical fibers, optical waveguides, etc., in conjunction with such integrated optical devices. In an ideal PM optical link for data communication, only one polarization of light is excited, so as to avoid impairments of that one polarization of light that may be caused by and/or associated with the other polarization of light. However, in real-world optical data communication systems, optical fiber sections often need to be connected, and these connections are optically imperfect, leading to cross-coupling between the two polarizations.

In a PM optical data communication link, cross-coupling between polarizations leads to impairments in light transmission, such as losses and multi-path interference, among others, that are not present in a non-PM optical data communication link. Embodiments are described herein for mitigating and/or managing polarization-related impairments in light transmission through the PM optical data communication link, including one or more of: insertion and use of polarizers, management of polarization-mode-dispersion (e.g., through selection of optical fiber types, optical fiber lengths, and/or coupling of selected optical fibers with reversed orientation), and management of cross-coupling between polarizations (e.g., through selection of optical connectors and/or optical splices).

In some embodiments, a polarized light signal is launched by a first integrated optical device into a PM optical data communication link that optically connects the first integrated optical device to a second integrated optical device. The polarized light signal travels through the PM optical data communication link and is received by the second integrated optical device. As the polarized light signal travels through the PM optical data communication link between the first integrated optical device and the second integrated optical device, the polarized light signal travels through multiple polarization paths and experiences multi-path interference (MPI). In various embodiments, the MPI is a function one or more characteristics of the PM optical data communication link, including one or more of: characteristics of the PM optical fiber sections within the PM optical data communication link (e.g., PM optical fiber section lengths, group index, PM optical fiber section thermal coefficients, among others), characteristics of the optical connections between PM optical fibers within the PM optical data communication link (e.g., misalignment angle and/or cross-coupling of the optical connectors and/or splices), the alignment between a PM optical fiber and the first integrated optical device, and the alignment between a PM optical fiber and the second integrated optical device.

It is of particular interest to avoid polarization-related impairments in light transmission through the PM optical data communication link when the optical data communication system includes an integrated optical transmitter that operates to transmit high-bandwidth modulated optical signals that are modulated onto each of several wavelength-division-multiplexed (WDM) wavelengths. It is also of particular interest to avoid polarization-related impairments in light transmission through the PM optical data communication link when the optical data communication system includes an integrated optical receiver that operates to detect light that is incident from only one of the PM optical fiber's polarizations. It is also of particular interest to avoid polarization-related impairments in light transmission through the PM optical data communication link when the optical data communication system does not provide for substantive adjustment/control of the light wavelengths of the transmitted modulated optical signals, particularly in response to an observed optical transmission wavelength spectrum during operation of the optical data communication system.

The challenges associated with polarization-related impairments in light transmission through the PM optical data communication link are particularly severe for baud rates greater than about 20 G samples per second, and even more severe for baud rates greater than about 45 G samples per second, because with such optical data transmission speeds there is a higher probability that polarization-related impairments will intersect the signal band in the frequency domain. Also, the probability of at least one data communication wavelength channel experiencing an unacceptable polarization-related impairment increases with the number of data communication wavelength channels per optical fiber. Also, the probability of at least one data communication wavelength channel experiencing an unacceptable polarization-related impairment increases with the number of optical fibers that are attached to each of the integrated optical transmitter and/or the integrated optical receiver.

An integrated optical device, e.g., transmitter and/or receiver, that is connected to a small number of optical fibers, e.g., less than four optical fibers, and/or operates with a small number of WDM channels per optical fiber, e.g., less than five WDM channels per optical fiber, may suffer a moderate yield loss due to polarization-related impairments in light transmission. However, an optical data communication system that includes many optical fibers, e.g., four or more optical fibers, and/or many WDM channels per optical fiber, e.g., five or more WDM channels per optical fiber, may suffer severe yield loss due to polarization-related impairments in light transmission, and therefore require more careful management of polarization-related impairments in light transmission.

The embodiments described herein for mitigating and/or managing polarization-related impairments in light transmission through the PM optical data communication link are usable in optical data communication systems that have essentially any number of PM optical fibers optically connected to a given integrated optical device. The embodiments described herein for mitigating and/or managing polarization-related impairments in light transmission through the PM optical data communication link are particularly applicable to optical data communication systems that include four or more PM optical fibers attached to a single integrated optical device, and are even more applicable to optical data communication systems that include nine or more optical fibers attached to a single integrated optical device, and are especially applicable to optical data communication systems that include twelve or more optical fibers attached to a single integrated optical device, where the single integrated optical device includes one or more optical receiver elements/devices/components/systems and/or one or more optical transmitter elements/devices/components/systems.

The embodiments described herein for mitigating and/or managing polarization-related impairments in light transmission through the PM optical data communication link are usable in optical data communication systems that have essentially any number of WDM wavelength channels per optical fiber. The embodiments described herein for mitigating and/or managing polarization-related impairments in light transmission through the PM optical data communication link are particularly applicable to optical data communication systems that include five or more WDM wavelength channels per optical fiber, and even more applicable to optical data communication systems that include eight or more WDM wavelength channels per optical fiber, and especially applicable to optical data communication systems that include twelve or more WDM wavelength channels per optical fiber.

FIG. 1 shows a diagram of an optical data communication system 100 that includes an optical transmitter 101 (Tx) optically connected through a PM optical data communication link 103 to an optical receiver 105 (Rx), in accordance with some embodiments. The direction of travel of light through the PM optical data communication link 103 from the optical transmitter 101 to the optical receiver 105 is indicated by arrows 102. The example PM optical data communication link 103 includes five sections of PM optical fiber(s) 107-1, 107-2, 107-3, 107-4, 107-5. In some embodiments, each section of PM optical fiber(s) 107-1, 107-2, 107-3, 107-4, 107-5 includes multiple optical fibers. In some embodiments, the multiple optical fibers in each section of PM optical fibers 107-1, 107-2, 107-3, 107-4, 107-5 are collectively formed as an optical fiber array, such as an optical fiber ribbon. The PM optical fiber section 107-1 has a first end optically connected to an optical output of the optical transmitter 101. The PM optical fiber section 107-1 has a second end optically connected to an optical connector 109-1. The PM optical fiber section 107-2 has a first end optically connected to the optical connector 109-1 and a second end optically connected to an optical connector 109-2. The PM optical fiber section 107-3 has a first end optically connected to the optical connector 109-2 and a second end optically connected to an optical connector 109-3. The PM optical fiber section 107-4 has a first end optically connected to the optical connector 109-3 and a second end optically connected to an optical connector 109-4. The PM optical fiber section 107-5 has a first end optically connected to the optical connector 109-4 and a second end optically connected to an optical input of the optical receiver 105. In some embodiments, the PM optical fiber section 107-3 is longer than the other PM optical fiber sections 107-1, 107-2, 107-4, 107-5.

The optical data communication system 100 also includes a laser 111 configured to generate continuous wave laser light at one or more wavelengths and transmit the continuous wave laser light to the optical transmitter 101 through an optical link 113. The optical link 113 includes optical fiber sections 115-1, 115-2, and 115-3. The optical fiber section 115-1 has a first end optically connected to an optical output of the laser 111. The optical fiber section 115-1 has a second end optically connected to an optical connector 117-1. The optical fiber section 115-2 has a first end optically connected the optical connector 117-1 and a second end optically connected to an optical connector 117-2. The optical fiber section 115-3 has a first end optically connected the optical connector 117-2 and a second end optically connected to a laser supply optical input of the optical transmitter 101. In some embodiments, each optical fiber section 115-1, 115-2, 115-3 is a single optical fiber. In some embodiments, each optical fiber section 115-1, 115-2, 115-3 includes multiple optical fibers. In some embodiments, each optical fiber section 115-1, 115-2, 115-3 is formed by non-PM optical fiber(s). In these embodiments, the optical transmitter 101 (or optical transceiver that includes the optical transmitter 101) is configured to split the polarizations of the incoming continuous wave laser light to enable generation of a modulated optical signal having a single polarization by the optical transmitter 101 for transmission through the PM optical data communication link 103 to the optical receiver 105. In some embodiments, the laser 111 is configured to output continuous wave laser light (of one or more wavelengths) at a single polarization. In these embodiments, each optical fiber section 115-1, 115-2, 115-3 is formed by PM optical fiber(s).

In some embodiments, the optical transmitter 101 is implemented within an optical transceiver that includes both optical transmitter and optical receiver components. Similarly, in some embodiments, the optical receiver 105 is implemented within an optical transceiver that includes both optical transmitter and optical receiver components. In the embodiments in which the optical receiver 105 is implemented within an optical transceiver, the laser 111 is optically connected through an optical link 119 to the optical transceiver that includes the optical receiver 105. The optical link 119 includes optical fiber sections 121-1, 121-2, and 121-3. The optical fiber section 121-1 has a first end optically connected to an optical output of the laser 111. The optical fiber section 121-1 has a second end optically connected to an optical connector 123-1. The optical fiber section 121-2 has a first end optically connected the optical connector 123-1 and a second end optically connected to an optical connector 123-2. The optical fiber section 121-3 has a first end optically connected the optical connector 123-2 and a second end optically connected to a laser supply optical input of the optical transceiver that includes the optical receiver 105. In some embodiments, each optical fiber section 121-1, 121-2, 121-3 is a single optical fiber. In some embodiments, each optical fiber section 121-1, 121-2, 121-3 includes multiple optical fibers. In some embodiments, each optical fiber section 121-1, 121-2, 121-3 is formed by non-PM optical fiber(s). In these embodiments, the transceiver that includes the optical receiver 105 is configured to split the polarizations of the incoming continuous wave laser light to enable generation of a modulated optical signal having a single polarization. In some embodiments, the laser 111 is configured to output continuous wave laser light (of one or more wavelengths) at a single polarization. In these embodiments, each optical fiber section 121-1, 121-2, 121-3 is formed by PM optical fiber(s).

It should be understood that FIG. 1 shows optical connections in a schematic manner for ease of description. However, in some embodiments, in the physical implementation of the optical data communication system 100, the optical fibers of the optical link 113 that carry laser light to the optical transmitter 101 are attached as a single array of optical fibers to an integrated optical device (integrated optical transceiver) that includes the optical transmitter 101. Also, in some embodiments, in the physical implementation of the optical data communication system 100, the optical fibers of the PM optical data communication link 103 that carry modulated light signals away from the optical transmitter 101 are attached as a single array of optical fibers to an integrated optical device (integrated optical transceiver) that includes the optical transmitter 101. Also, in some embodiments, in the physical implementation of the optical data communication system 100, the optical fibers of the PM optical data communication link 103 that carry modulated light signals into the optical receiver 105 are attached as a single array of optical fibers to an integrated optical device (integrated optical transceiver) that includes the optical receiver 105.

In some embodiments, a small fiber-to-fiber misalignment exists at each of the optical connectors 109-1, 109-2, 109-3, 109-4 within the PM optical data communication link 103. Each of the fiber-to-fiber misalignments at the optical connectors 109-1, 109-2, 109-3, 109-4 causes optical coupling between polarizations. Also, in some embodiments, each section of the PM optical fiber(s) 107-1, 107-2, 107-3, 107-4, 107-5 within the PM optical data communication link 103 causes a wavelength-dependent differential phase between the polarizations. Also, in some embodiments, each fiber-to-chip optical coupling, such as between the optical transmitter 101 and the section of PM optical fiber(s) 107-1, and such as between the optical receiver 105 and the section of PM optical fiber(s) 107-5, functions as an optical polarizer.

In some embodiments, a polarization suppression device is optically coupled to the PM optical data communication link 103. For example, FIG. 1 shows a first polarization suppression device 108-1 optically coupled to the first PM optical fiber 107-1 at a location between the optical output of the optical transmitter 101 and the first optical connector 109-1. FIG. 1 also shows a second polarization suppression device 108-2 optically coupled to the second PM optical fiber 107-2 at a location between the first optical connector 109-1 and the second optical connector 109-2. FIG. 1 also shows a third polarization suppression device 108-3 optically coupled to the third PM optical fiber 107-3 at a location between the second optical connector 109-2 and the third optical connector 109-3. FIG. 1 also shows a fourth polarization suppression device 108-4 optically coupled to the fourth PM optical fiber 107-4 at a location between the third optical connector 109-3 and the fourth optical connector 109-4. FIG. 1 also shows a fifth polarization suppression device 108-5 optically coupled to the fifth PM optical fiber 107-5 at a location between the fourth optical connector 109-4 and the optical input of the optical receiver 105. It should be understood that in various embodiments, the PM optical data communication link 103 can include any one or more of the first polarization suppression device 108-1, the second polarization suppression device 108-2, the third polarization suppression device 108-3, the fourth polarization suppression device 108-4, and the fifth polarization suppression device 108-5. Also, in some embodiments, the PM optical data communication link 103 does not include any of the first polarization suppression device 108-1, the second polarization suppression device 108-2, the third polarization suppression device 108-3, the fourth polarization suppression device 108-4, and the fifth polarization suppression device 108-5. In some embodiments, any one or more of the first polarization suppression device 108-1, the second polarization suppression device 108-2, the third polarization suppression device 108-3, the fourth polarization suppression device 108-4, and the fifth polarization suppression device 108-5 is a polarizer configured to suppress one of two polarization modes. In some embodiments, any one or more of the first polarization suppression device 108-1, the second polarization suppression device 108-2, the third polarization suppression device 108-3, the fourth polarization suppression device 108-4, and the fifth polarization suppression device 108-5 is a polarization-dependent loss element configured to suppress one of two polarization modes.

Figure 2:
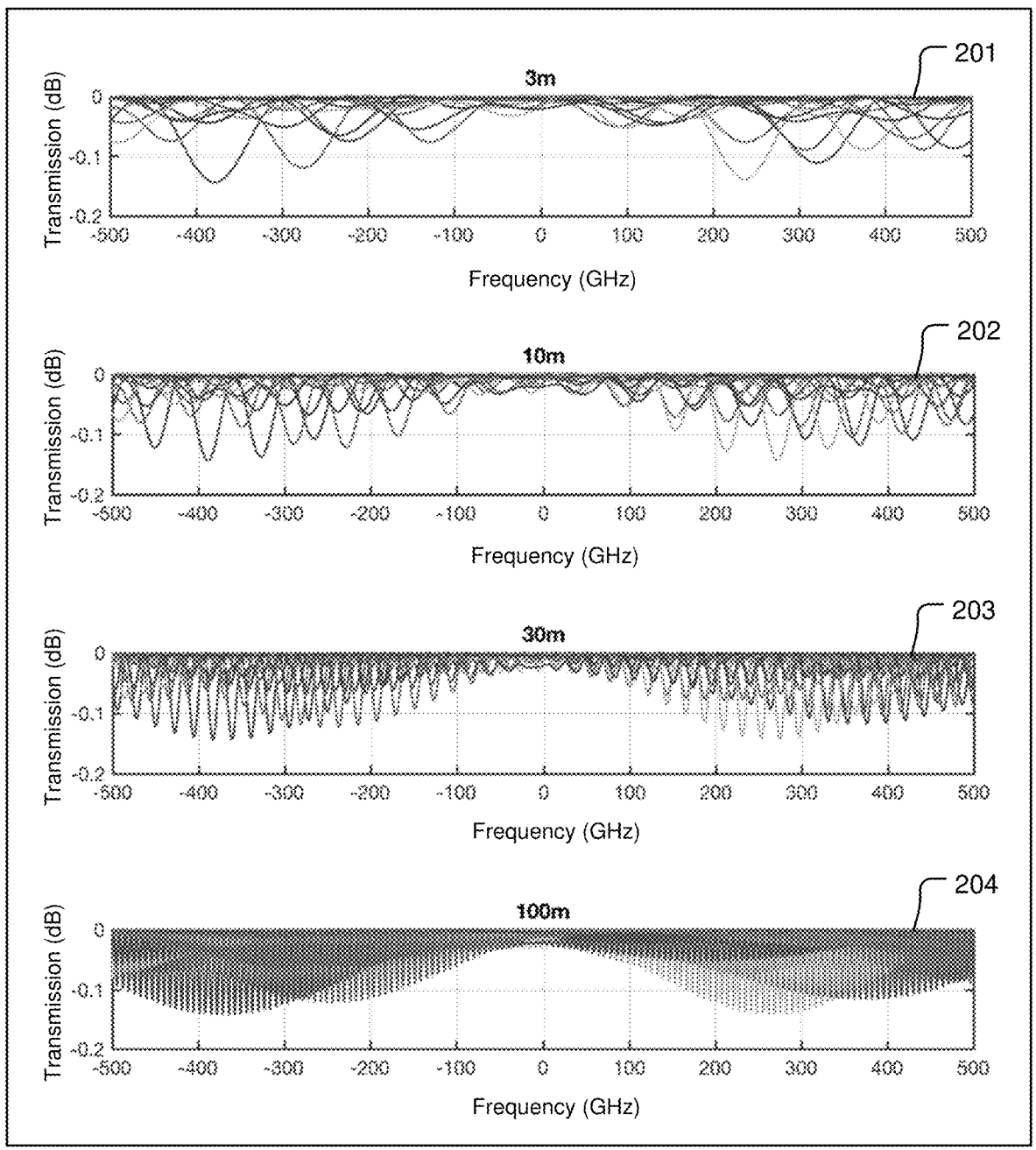
FIG. 2 shows various plots of optical transmission over a frequency range for the polarization-maintaining optical data communication link of FIG. 1, in accordance with some embodiments.

FIG. 2 shows various plots 201, 202, 203, 204 of optical transmission in decibels (dB) over a frequency range extending from −500 gigaHertz (GHz) to +500 GHz for the PM optical data communication link 103 that includes the five PM optical fiber sections 107-1, 107-2, 107-3, 107-4, 107-5, in accordance with some embodiments. The different plots 201, 202, 203, 204 of optical transmission shown in FIG. 2 correspond to implementation of the PM optical data communication link 103 using different lengths for the PM optical fiber section 107-3 (the center PM optical fiber section), while maintaining the lengths of the other PM optical fiber sections 107-1, 107-2, 107-4, 107-5 at their respective values. In each configuration of the PM optical data communication link 103 used to generate the plots 201, 202, 203, 204, the first PM optical fiber section 107-1 has a length of about 0.6 meter, the second PM optical fiber section 107-2 has a length of about 1 meter, the fourth PM optical fiber section 107-4 has a length of about 1 meter, and the fifth PM optical fiber section 107-5 has a length of about 0.6 meter. In the PM optical data communication link 103 used to generate the plot 201, the third PM optical fiber section 107-3 has a length of about 3 meters. In the PM optical data communication link 103 used to generate the plot 202, the third PM optical fiber section 107-3 has a length of about 10 meters. In the PM optical data communication link 103 used to generate the plot 203, the third PM optical fiber section 107-3 has a length of about 30 meters. In the PM optical data communication link 103 used to generate the plot 204, the third PM optical fiber section 107-3 has a length of about 100 meters.

For generation of the plots 201, 202, 203, 204, the fiber polarization mode dispersion (PMD) is about 1.3 picoseconds per meter (ps/m). The optical fiber PMD is the average differential group delay (DGD), where the DGD is the time separation (or delay) between the two principle polarization states at the optical receiver 105. The DGD is a random value that can be approximated by a Maxwellian probability distribution. The PMD is the average value of the DGD over a distribution of a large number of independent DGD measurements. Each of plots 201, 202, 203, 204 includes 16 random realizations plotted together. Also, for generation of the plots 201, 202, 203, 204, the misalignment angles at the optical connectors 109-1, 109-2, 109-3, 109-4 for the 16 random realizations are sampled as independent gaussian random variables with a standard deviation of one degree.

Comparison of the plots 201, 202, 203, 204 reveals that a frequency-dependent loss is introduced within the PM optical data communication link 103 by polarization coupling. Comparison of the plots 201, 202, 203, 204 also reveals that longer PM optical fibers produce rapid variations in optical transmission with frequency (due to increased PMD), which may be undesirable. The worst-case optical loss across the wavelength range is a function of the random misalignments at the optical connectors 109-1, 109-2, 109-3, 109-4, and this optical loss can be reduced by tightening the angular alignment tolerance at the optical connectors 109-1, 109-2, 109-3, 109-4. In some embodiments, it is desirable to choose a PM optical fiber with relatively small PMD, in order to produce a transmission response that oscillates less rapidly with frequency.

In some embodiments, one or more of the optical connections (provided by the optical connectors 109-1, 109-2, 109-3, 109-4) between the PM optical fiber sections 107-1, 107-2, 107-3, 107-4, 107-5 is made by reversing the polarization axes between each pair of optically connected PM optical fibers. More specifically, for a given pair of optically connected PM optical fibers, the slow axis of one PM optical fiber of the pair is aligned to the fast axis of the other PM optical fiber of the pair. This reversed alignment of polarization axes at the connection between two PM optical fibers will tend to introduce cancellation of the PMD of the two connected PM optical fibers and produce an optical transmission response that oscillates less rapidly with frequency.

Figure 3A:
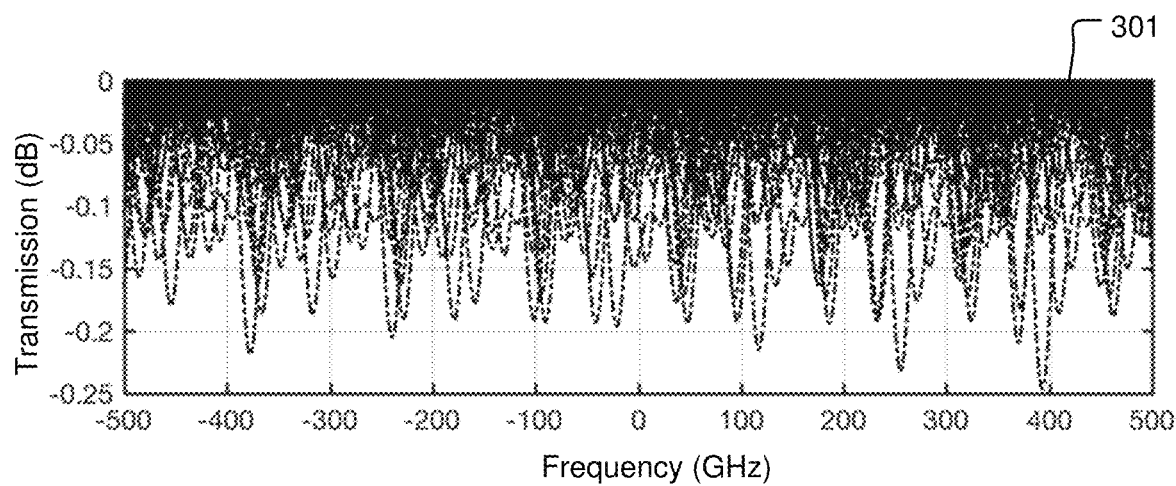
FIG. 3A shows a plot of optical transmission over a frequency range for the polarization-maintaining optical data communication link of FIG. 1 in which the fiber-to-fiber connections between the polarization-maintaining optical fiber sections at each of the optical connectors have a standard alignment of polarization axes, in accordance with some embodiments.
Figure 3B:
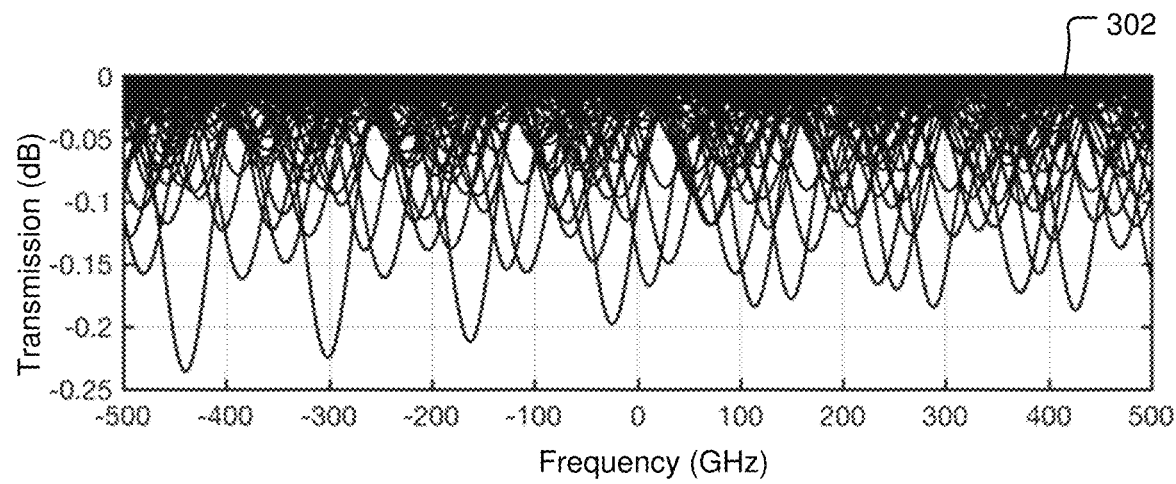
FIG. 3B shows a plot of optical transmission over a frequency range for the polarization-maintaining optical data communication link of FIG. 1 in which the fiber-to-fiber connections between the polarization-maintaining optical fiber sections at each of the optical connectors have the reversed alignment of polarization axes, in accordance with some embodiments.

FIG. 3A shows a plot 301 of optical transmission in dB over a frequency range extending from −500 GHz to +500 GHz for the PM optical data communication link 103 in which the fiber-to-fiber connections between the PM optical fiber sections 107-1, 107-2, 107-3, 107-4, 107-5 at each of the optical connectors 109-1, 109-2, 109-3, 109-4 have a standard alignment of polarization axes in which the slow axis of one PM optical fiber is aligned to the slow axis of another PM optical fiber for each connected pair of PM optical fibers at the optical connectors 109-1, 109-2, 109-3, 109-4, in accordance with some embodiments. FIG. 3B shows a plot 302 of optical transmission in dB over a frequency range extending from −500 GHz to +500 GHz for the PM optical data communication link 103 in which the fiber-to-fiber connections between the PM optical fiber sections 107-1, 107-2, 107-3, 107-4, 107-5 at each of the optical connectors 109-1, 109-2, 109-3, 109-4 have the reversed alignment of polarization axes (connection of PM optical fibers with alternating orientation of polarization axes) in which the slow axis of one PM optical fiber is aligned to the fast axis of another PM optical fiber for each connected pair of PM optical fibers at the optical connectors 109-1, 109-2, 109-3, 109-4, in accordance with some embodiments. In the PM optical data communication link 103 used to generate the plots 301 and 302, the first PM optical fiber section 107-1 has a length of about 0.2 meter, the second PM optical fiber section 107-2 has a length of about 5 meters, the third PM optical fiber section 107-3 has a length of about 10 meters, the fourth PM optical fiber section 107-4 has a length of about 5 meters, and the fifth PM optical fiber section 107-5 has a length of about 0.2 meter. Comparison of plots 301 and 302 reveals that connection of the PM optical fibers using the reversed alignment of polarization axes (plot 302) produces a substantially smoother frequency response with comparable average optical transmission and minimum optical transmission.

Figure 4A:
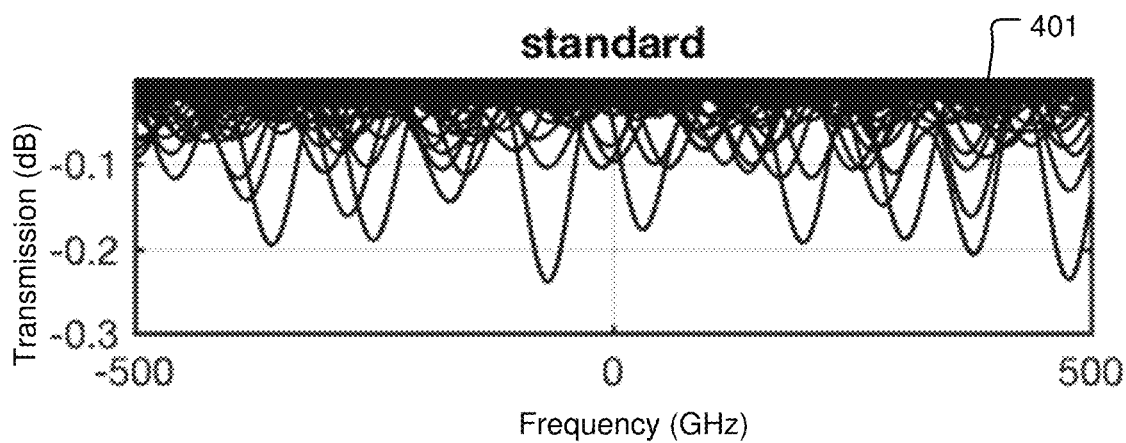
FIG. 4A shows a plot of optical transmission over a frequency range for the polarization-maintaining optical data communication link of FIG. 1 without insertion of polarizers, in accordance with some embodiments.
Figure 4B:
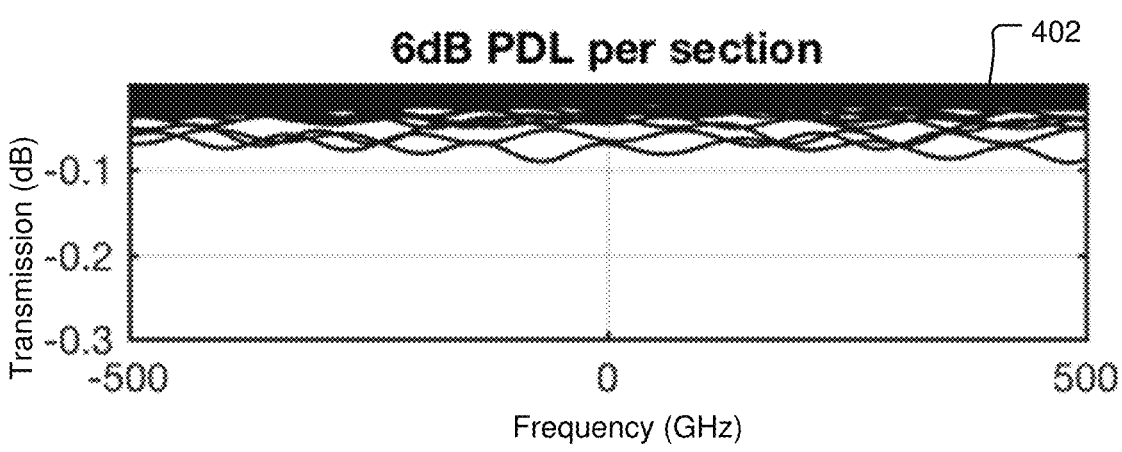
FIG. 4B shows a plot of optical transmission over a frequency range for the polarization-maintaining optical data communication link of FIG. 1 with insertion of polarizers, in accordance with some embodiments.

In some embodiments, one or more polarizers and/or polarization-dependent loss elements is/are inserted within the PM optical data communication link 103, so that even if adverse polarization components are generated by misalignment(s) between PM optical fibers within the PM optical fiber sections 107-1, 107-2, 107-3, 107-4, 107-5 at one or more of the optical connectors 109-1, 109-2, 109-3, 109-4, the adverse polarization components will be extinguished before being coupled back into the primary polarization. FIG. 4A shows a plot 401 of optical transmission in dB over a frequency range extending from −500 GHz to +500 GHz for the PM optical data communication link 103 that includes the five PM optical fiber sections 107-1, 107-2, 107-3, 107-4, 107-5, without insertion of polarizers, in accordance with some embodiments. FIG. 4B shows a plot 402 of optical transmission in dB over a frequency range extending from −500 GHz to +500 GHz for the PM optical data communication link 103 that includes the five PM optical fiber sections 107-1, 107-2, 107-3, 107-4, 107-5, with insertion of polarizers, in accordance with some embodiments. In the PM optical data communication link 103 used to generate the plots 401 and 402, the first PM optical fiber section 107-1 has a length of about 0.4 meter, the second PM optical fiber section 107-2 has a length of about 1.2 meters, the third PM optical fiber section 107-3 has a length of about 5 meters, the fourth PM optical fiber section 107-4 has a length of about 1.2 meters, and the fifth PM optical fiber section 107-5 has a length of about 0.4 meter. Each of plots 401 and 402 includes 100 random realizations plotted together. Also, for generation of the plots 401 and 402, the fiber-to-fiber misalignment angles at the optical connectors 109-1, 109-2, 109-3, 109-4 for the 100 random realizations are sampled as independent gaussian random variables with a standard deviation of one degree. The plot 401 of FIG. 4A is for the PM optical data communication link 103 without insertion of polarizers. The plot 402 of FIG. 4B is for the PM optical data communication link 103 with polarizer(s) inserted in each of the five PM optical fiber sections 107-1, 107-2, 107-3, 107-4, 107-5 to provide a 6 dB suppression of unwanted polarization in each of the five PM optical fiber sections 107-1, 107-2, 107-3, 107-4, 107-5. Comparison of plots 401 and 402 shows that insertion of polarizers within the PM optical data communication link 103 substantially reduces optical transmission loss.

Figure 5A:
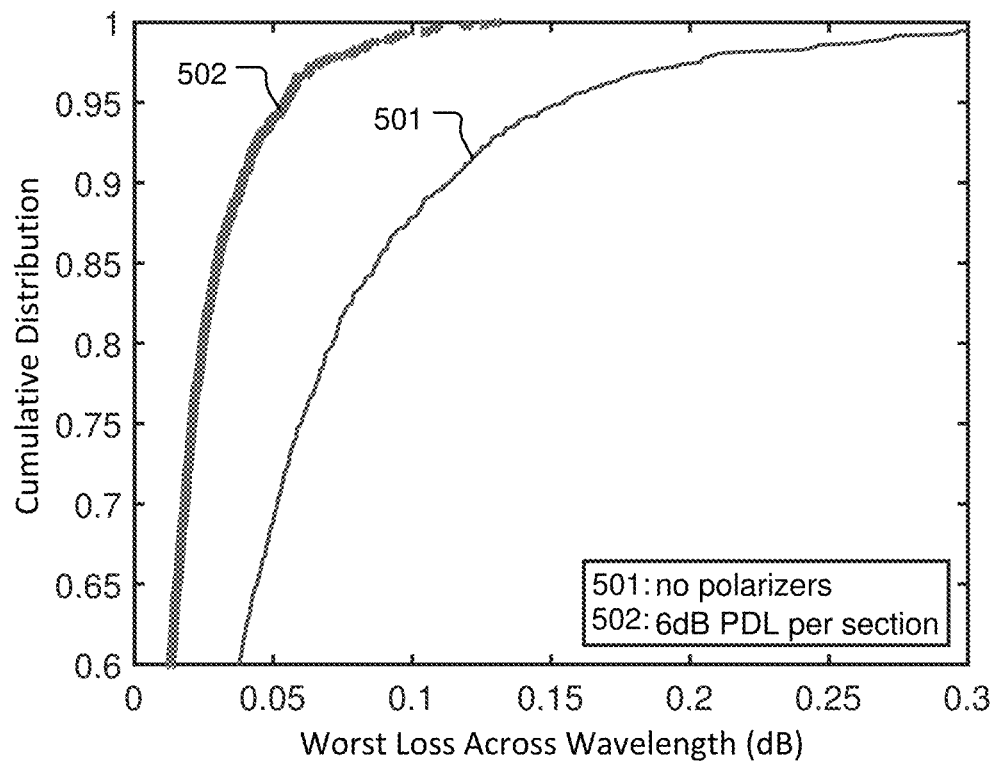
FIG. 5A shows plots of a cumulative distribution function of the worst optical transmission loss over a frequency range for the configurations of the polarization-maintaining optical data communication link of FIG. 1 used to generate the plots of FIGS. 4A and 4B, respectively, with the fiber-to-fiber misalignment angles at the optical connectors sampled as independent gaussian random variables with a standard deviation of one degree, in accordance with some embodiments.

FIG. 5A shows plots 501 and 502 of a cumulative distribution function (estimated from 1024 realizations) of the worst optical transmission loss over a frequency range of 3.4 teraHertz (THz) (which is an illustrative full-range of the WDM system) for the PM optical data communication link 103 configurations used to generate the plots 401 and 402, respectively, of FIGS. 4A and 4B, respectively, with the fiber-to-fiber misalignment angles at the optical connectors 109-1, 109-2, 109-3, 109-4 for the 1024 random realizations sampled as independent gaussian random variables with a standard deviation of one degree, in accordance with some embodiments. For a given level of polarization-related impairment, the PM optical data communication link 103 with polarizers (plot 502) has a much higher cumulative probability than the PM optical data communication link without polarizers (plot 501). Therefore, the PM optical data communication link 103 with polarizers is much less likely to fail a required level of performance. For example, if the optical data communication system 100 requires a worst-case optical transmission loss of less than or equal to 0.15 dB across the 3.4 THz operating band, the PM optical data communication link 103 without polarizers has about a five percent chance of failing the worst-case optical transmission loss requirement, while the PM optical data communication link 103 with polarizers has much less than a one percent chance of failing the worst-case optical transmission loss requirement.

Figure 5B:
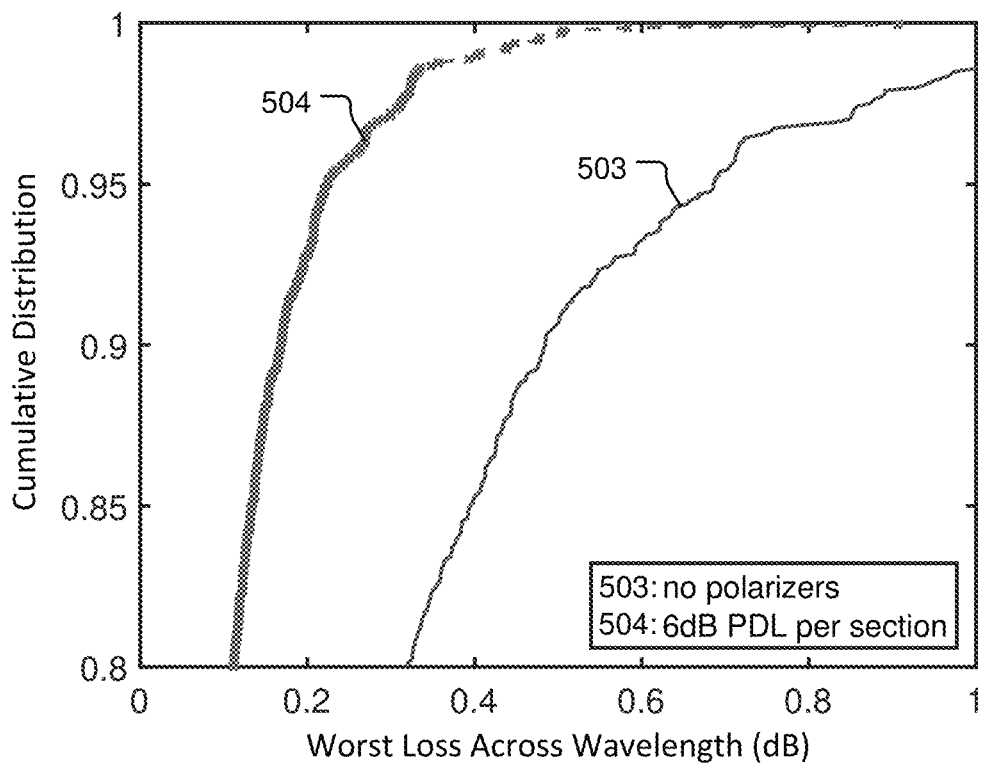
FIG. 5B shows plots of a cumulative distribution function of the worst optical transmission loss over a frequency range for the configurations of the polarization-maintaining optical data communication link of FIG. 1 used to generate the plots of FIGS. 4A and 4B, respectively, with the fiber-to-fiber misalignment angles at the optical connectors sampled as independent gaussian random variables with a standard deviation of two degrees, in accordance with some embodiments.

FIG. 5B shows plots 503 and 504 of the cumulative distribution function (estimated from 1024 realizations) of the worst optical transmission loss over a frequency range of 3.4 THz for the PM optical data communication link 103 configurations used to generate the plots 401 and 402, respectively, of FIGS. 4A and 4B, respectively, with the fiber-to-fiber misalignment angles at the optical connectors 109-1, 109-2, 109-3, 109-4 for the 1024 random realizations sampled as independent gaussian random variables with a standard deviation of two degrees, in accordance with some embodiments. For a given level of polarization-related impairment, the PM optical data communication link 103 with polarizers (plot 504) has a much higher cumulative probability than the PM optical data communication link without polarizers (plot 503). Therefore, the PM optical data communication link 103 with polarizers is much less likely to fail a required level of performance. Two standard deviation Gaussian sampling of the fiber-to-fiber misalignment angles at the optical connectors 109-1, 109-2, 109-3, 109-4 is representative of optical connectors that are compatible with optical fiber ribbons and arrays. Under standard assumptions, worst-case optical transmission loss of greater than about 1 dB is rare, but still occurs in one to two percent of optical links, as indicated by plot 503. If an integrated optics device were attached to an array of fibers forming a number (N, e.g., N=4) of optical links, the yield loss would be approximately N times the yield per link. In this case, a one to two percent failure rate per optical link may be unacceptable.

The impact of polarization-related impairments on the total performance of the optical data communication system (e.g., capacity, bit-error-rate, power consumption, etc.) will depend on which signal processing techniques are used. These signal processing techniques may include analog or digital techniques. Also, in some embodiments, these signal processing techniques are implemented as circuits. In some embodiments, the receiving integrated optical device includes on-chip circuits for performing continuous-time linear equalization (CTLE) or other type of linear equalization. In some embodiments, the receiving integrated optical device includes on-chip circuits for performing decision feedback equalization (DFE) or another type of non-linear equalization. In some embodiments in which DFE is used, PMD is reduced so that a time-domain representation of the polarization-related impairment substantially falls within the range of samples available in the DFE.

In some embodiments, the lengths of optical fibers are tailored to improve the probability of having low polarization-impairment optical links. For example, when an application calls for a required reach, there may be substantial freedom to select lengths of the individual optical fiber sections within the optical link. In some embodiments, techniques are implemented to achieve improved angular tolerances and/or reduced cross-coupling between connected PM optical fiber sections, including, but not limited to, selection of optical connectors with improved tolerance, such as single-fiber connectors (e.g., fixed connection (FC) connector, among others), fiber-array connectors (e.g., mechanical transfer (MT) connector, among others), or other type of optical connector. Also, in some embodiments, splicing of individual optical fibers or splicing of optical fiber ribbons is used to achieve improved angular tolerances and/or reduced cross-coupling between connected PM optical fiber sections.

In some embodiments, optical fiber(s) is/are optically connected to an integrated optical device using a connector for the purpose of optical alignment and/or testing, and to achieve improved polarization performance in final operation. In some embodiments, a sacrificial connector is attached to the integrated optical device or coupling assembly to provide for optical alignment and/or testing, with the sacrificial connector being removed at a later time. In some embodiments, an optical fiber array is attached to an integrated optical device. In these embodiments, the optical fiber array includes a subset of optical fibers for use in optical alignment and/or testing, with the subset of optical fibers being fanned-out from other optical fibers and connectorized.

The simulations used to generate the plots shown in FIGS. 2, 3A, 3B, 4A, 4B, 5A, and 5B use a Jones matrix representation, where the polarization of an input signal is given by a two-dimensional complex vector, $u_{in}$. A 2×2 matrix represents each transformation of the polarization, for example by the $n^{th}$ section of fiber ($T_n^{fiber}$) or the $m^{th}$ coupling point ($T_m^c$), and the polarization of the output is calculated by cascading these transformations as follows:

$$u_{out} = T_{N+1}^c T_N^{fiber}...T_2^{fiber} T_2^c T_1^{fiber} T_1^c u_{in}.$$

Each section of PM optical fiber in the multi-section PM optical data communication link, e.g., 103, imparts a frequency-dependent differential phase $\phi_n(f)$ between the primary polarization (the one which ideally would be excited) and the secondary, unwanted polarization. Commercially available PMF have beat lengths on the order of a few millimeters (mm), and so for reasonable lengths of fiber much greater than one centimeter (cm), this differential phase is very large. Also, even the uncertainty in the length of the optical fiber due to cleaving precision is on the order of the beat length. Therefore, it is assumed that each section of optical fiber within the multi-section PM optical data communication link randomly re-phases the polarization components. Also, the frequency-dependent differential phase is often characterized by the PMD delay, which is on the order of 1 picosecond per meter of PMF, and is adjustable by design and/or selection of the optical fiber.

Each time light passes through a PMF section in the PM optical link and is imperfectly coupled, interference between the two delayed components is locked in and can lead to impairments at the optical receiver. In some embodiments, optical coupling between PM sections or devices is characterized by an extinction ratio or an (effective) misalignment angle θ, defined so that for an ideal launch, the power coupled into the desired and unwanted polarizations are proportional to $\cos^2(\theta)$ and $\sin^2(\theta)$, respectively, and the extinction ratio (ER) is given as ER=−10 log 10($\tan^2(\theta)$). This is discussed in "Application Note—Polarization Measurements—OZ Optics Family of Polarization Maintaining Components, Sources, and Measurements Systems," by OZ Optics LTD, of Canada, Aug. 6, 1999, which is incorporated herein by reference in its entirety for all purposes.

In accordance with the foregoing, in some embodiments, an optical data communication system (e.g., 100) is disclosed to include an optical transmitter (e.g., 101), an optical receiver (e.g., 105), and a PM optical data communication link (e.g., 103) extending from an optical output of the optical transmitter to an optical input of the optical receiver. In some embodiments, the optical transmitter is configured to transmit modulated light having a plurality of WDM wavelengths through the PM optical data communication link. The PM optical data communication link includes at least two sections of PM optical fiber (e.g., 107-1 to 107-5) optically connected through an optical connector (e.g., 109-1 to 109-4). In some embodiments, the at least two sections of PM optical fiber have different lengths. In some embodiments, a length of at least one section of the at least two sections of PM optical fiber is at least three times greater than a length of another section of the at least two sections of PM optical fiber. In some embodiments, each of the at least two sections of PM optical fiber includes a plurality of PM optical fibers. In some of these embodiments, the plurality of PM optical fibers is formed as an optical fiber ribbon.

In some embodiments, the optical connector (e.g., 109-1 to 109-4) is configured to optically align a fast polarization axis of a first PM optical fiber to a slow polarization axis of a second PM optical fiber, and optically align a slow polarization axis of the first PM optical fiber to a fast polarization axis of the second PM optical fiber. In some embodiments, one or more of the at least two sections of PM optical fiber includes a polarizer (e.g., 108-1 to 108-5) configured to suppress one of two polarization modes. In some embodiments, each of the at least two sections of PM optical fiber includes a separate polarizer configured to suppress a same one of two polarization modes. In some embodiments, one or more of the at least two sections of PM optical fiber includes a polarization-dependent loss element (e.g., 108-1 to 108-5) configured to suppress one of two polarization modes.

In some embodiments, the PM optical data communication link (e.g., 103) includes at least two optical connectors (e.g., 109-1 to 109-4), where each of the at least two optical connectors optically connects a separate pair of PM optical fibers (e.g., 107-1 to 107-5), such that a fast polarization axis of a first polarization-maintaining optical fiber of the separate pair of polarization-maintaining optical fibers is substantially aligned with a slow polarization axis of a second polarization-maintaining optical fiber of the separate pair of polarization-maintaining optical fibers. In some embodiments, substantial alignment of a fast polarization axis of a first PM optical fiber with a slow polarization axis of a second PM optical fiber in a connection between the first and second PM optical fibers exists when a fiber-to-fiber misalignment angle is less than or equal to about 10 degrees. The fiber-to-fiber misalignment angle is defined as an angle between the fast polarization axis of the first PM optical fiber and the slow polarization axis of the second PM optical fiber as measured about an optical core centerline of either the first PM optical fiber or the second PM optical fiber, with the optical core centerlines of the first and second PM optical fibers aligned with each other. In some embodiments, substantial alignment of the fast polarization axis of the first PM optical fiber with the slow polarization axis of the second PM optical fiber in the connection between the first and second PM optical fibers exists when the fiber-to-fiber misalignment angle is less than or equal to about 6 degrees. In some embodiments, substantial alignment of the fast polarization axis of the first PM optical fiber with the slow polarization axis of the second PM optical fiber in the connection between the first and second PM optical fibers exists when the fiber-to-fiber misalignment angle is less than or equal to about 3 degrees.

In some embodiments, the PM optical data communication link (e.g., 103) includes a first optical connector (e.g., 109-1), a second optical connector (e.g., 109-2), a third optical connector (e.g., 109-3), a fourth optical connector (e.g., 109-4), a first PM optical fiber (e.g., 107-1) optically connected between the output of the optical transmitter (e.g., 101) and the first optical connector, a second PM optical fiber (e.g., 107-2) optically connected between the first optical connector and the second optical connector, a third PM optical fiber (e.g., 107-3) optically connected between the second optical connector and the third optical connector, a fourth PM optical fiber (e.g., 107-4) optically connected between the third optical connector and the fourth optical connector, and a fifth PM optical fiber (e.g., 107-5) optically connected between the fourth optical connector and the optical input of the optical receiver (e.g., 105). In some embodiments, the first optical connector is configured to align a fast polarization axis of the first PM optical fiber to a slow polarization axis of the second PM optical fiber, and align a slow polarization axis of the first PM optical fiber to a fast polarization axis of the second PM optical fiber. Also, the second optical connector is configured to align a fast polarization axis of the second PM optical fiber to a slow polarization axis of the third PM optical fiber, and align a slow polarization axis of the second PM optical fiber to a fast polarization axis of the third PM optical fiber. Also, the third optical connector is configured to align a fast polarization axis of the third PM optical fiber to a slow polarization axis of the fourth PM optical fiber, and align a slow polarization axis of the third PM optical fiber to a fast polarization axis of the fourth PM optical fiber. Also, the fourth optical connector is configured to align a fast polarization axis of the fourth PM optical fiber to a slow polarization axis of the fifth PM optical fiber, and align a slow polarization axis of the fourth PM optical fiber to a fast polarization axis of the fifth PM optical fiber.

In some embodiments, a first polarization suppression device (e.g., 108-1) is optically coupled to the first PM optical fiber (e.g., 107-1) at a location between the optical output of the optical transmitter (e.g., 101) and the first optical connector (e.g., 109-1). Also, a second polarization suppression device (e.g., 108-2) is optically coupled to the second PM optical fiber (e.g., 107-2) at a location between the first optical connector (e.g., 109-1) and the second optical connector (e.g., 109-2). Also, a third polarization suppression device (e.g., 108-3) is optically coupled to the third PM optical fiber (e.g., 107-3) at a location between the second optical connector (e.g., 109-2) and the third optical connector (e.g., 109-3). Also, a fourth polarization suppression device (e.g., 108-4) is optically coupled to the fourth PM optical fiber (e.g., 107-4) at a location between the third optical connector (e.g., 109-3) and the fourth optical connector (e.g., 109-4). Also, a fifth polarization suppression device (e.g., 108-5) is optically coupled to the fifth PM optical fiber (e.g., 107-5) at a location between the fourth optical connector (e.g., 109-4) and the optical input of the optical receiver (e.g., 105).

Additionally, in accordance with the foregoing, in some embodiments, an optical data communication system (e.g., 100) is disclosed to include a PM optical data communication link (e.g., 103) that includes a first PM optical fiber (e.g., any of 107-1 to 107-5) optically coupled to a second PM optical fiber (e.g., any other of 107-1 to 107-5), such that a fast polarization axis of the first PM optical fiber is aligned with a slow polarization axis of the second PM optical fiber, and such that a slow polarization axis of the first PM optical fiber is aligned with to a fast polarization axis of the second PM optical fiber. In some embodiments, a polarization suppression device (e.g., any of 108-1 to 108-5) is optically coupled to the PM optical data communication link. In some embodiments, each optical connection between any two PM optical fibers within the PM optical data communication link has a fast polarization axis of one PM optical fiber aligned with a slow polarization axis of another PM optical fiber. In some embodiments, the PM optical data communication link extends from an optical output of an optical transmitter (e.g., 101) to an optical input of an optical receiver (e.g., 105).

Figure 6:
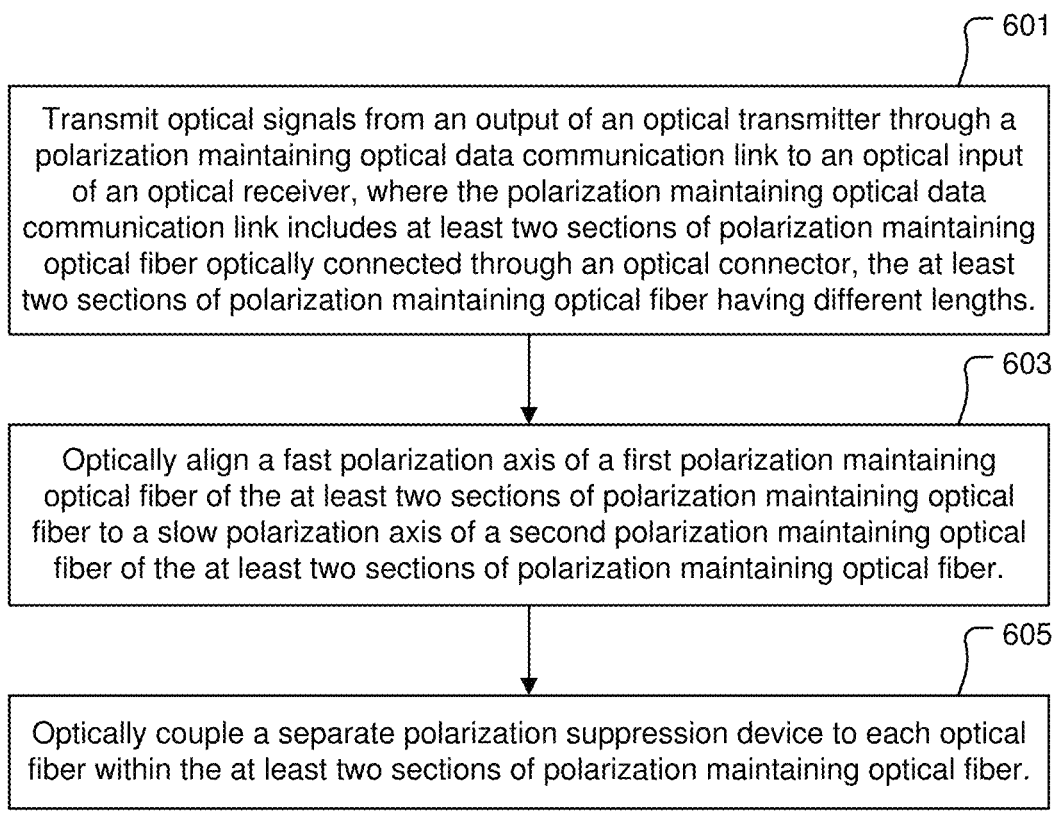
FIG. 6 shows an outline of a method for operating an optical data communication system, in accordance with some embodiments.

FIG. 6 shows an outline of a method for operating an optical data communication system, in accordance with some embodiments. The method of FIG. 6 includes an operation 601 for transmitting optical signals from an output of an optical transmitter (e.g., 101) through a PM optical data communication link (e.g., 103) to an optical input of an optical receiver (e.g., 105). The PM optical data communication link includes at least two sections of PM optical fiber (e.g., 107-1 to 107-5) optically connected through an optical connector (e.g., 109-1 to 109-4). The at least two sections of PM optical fiber have different lengths. In some embodiments, the method of FIG. 6 also includes an operation 603 for optically aligning a fast polarization axis of a first PM optical fiber of the at least two sections of PM optical fiber to a slow polarization axis of a second PM optical fiber of the at least two sections of PM optical fiber. In some embodiments, the method of FIG. 6 also includes an operation 605 for optically coupling a polarization suppression device (e.g., 108-1 to 108-5) to an optical fiber within the at least two sections of PM optical fiber.

Figure 7:
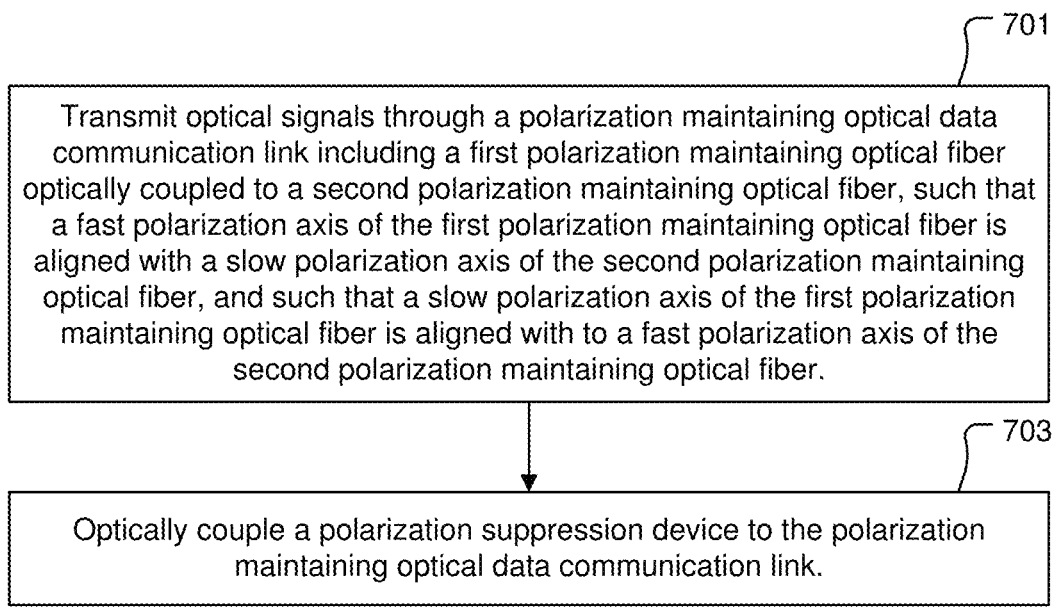
FIG. 7 shows an outline of a method for operating an optical data communication system, in accordance with some embodiments.

FIG. 7 shows an outline of a method for operating an optical data communication system, in accordance with some embodiments. The method of FIG. 7 includes an operation 701 for transmitting optical signals through a PM optical data communication link (e.g., 103) that includes a first PM optical fiber (e.g., any of 107-1 to 107-5) optically coupled to a second PM optical fiber (e.g., any other of 107-1 to 107-5), such that a fast polarization axis of the first PM optical fiber is aligned with a slow polarization axis of the second PM optical fiber, and such that a slow polarization axis of the first PM optical fiber is aligned with to a fast polarization axis of the second PM optical fiber. In some embodiments, the method of FIG. 7 includes an operation 703 for optically coupling a polarization suppression device (e.g., 108-1 to 108-5) to the PM optical data communication link. In some embodiments, the PM optical data communication link optically connects an optical output of an optical transmitter (e.g., 101) to an optical input of an optical receiver (e.g., 105).

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An optical data communication system, comprising:
an optical transmitter;
an optical receiver; and
a polarization-maintaining optical data communication link extending from an optical output of the optical transmitter to an optical input of the optical receiver, the polarization-maintaining optical data communication link including a plurality of sections of polarization-maintaining optical fiber, wherein sequentially positioned sections of the plurality of sections of polarization-maintaining optical fiber are optically connected through a respective mechanical transfer connector, wherein the respective mechanical transfer connector has a non-zero amount of fiber-to-fiber misalignment that introduces a non-zero amount of optical coupling between polarizations, wherein each of the plurality of sections of polarization-maintaining optical fiber includes a separate polarizer configured to suppress a same one of two polarization modes, wherein the plurality of sections of polarization-maintaining optical fiber includes a first section that has a first length, wherein the plurality of sections of polarization-maintaining optical fiber includes a second section that has a second length that is at least three times greater than the first length of the first section, wherein the first section and the second section are sequentially positioned within the polarization-maintaining optical data communication link, and wherein the first section and the second section are optically connected through a first mechanical transfer connector.

2. The optical data communication system as recited in claim 1, wherein the mechanical transfer connector is configured to optically align a fast polarization axis of the first section of the plurality of sections of polarization-maintaining optical fiber to a slow polarization axis of the second section of the plurality of sections of polarization-maintaining optical fiber, and wherein the mechanical transfer connector is configured to optically align a slow polarization axis of the first section of the plurality of sections of polarization-maintaining optical fiber to a fast polarization axis of the second section of the plurality of sections of polarization-maintaining optical fiber.

3. The optical data communication system as recited in claim 1, wherein the polarization-maintaining optical data communication link includes a polarizer configured to suppress one of two polarization modes.

4. The optical data communication system as recited in claim 1, wherein one or more of the plurality of sections of polarization-maintaining optical fiber includes a respective polarization-dependent loss element configured to suppress one of two polarization modes.

5. The optical data communication system as recited in claim 1, wherein each of the plurality of sections of polarization-maintaining optical fiber includes a respective plurality of polarization-maintaining optical fibers.

6. The optical data communication system as recited in claim 5, wherein the respective plurality of polarization-maintaining optical fibers is formed as an optical fiber ribbon.

7. The optical data communication system as recited in claim 1, wherein the optical transmitter is configured to transmit modulated light having a plurality of wavelength-divisional-multiplexed wavelengths through the polarization-maintaining optical data communication link.

8. The optical data communication system as recited in claim 1, wherein the polarization-maintaining optical data communication link includes at least two optical connectors, wherein the mechanical transfer connector is one of the at least two optical connectors, wherein each of the at least two optical connectors optically connects a separate pair of polarization-maintaining optical fibers, such that a fast polarization axis of a first polarization-maintaining optical fiber of the separate pair of polarization-maintaining optical fibers is substantially aligned with a slow polarization axis of a second polarization-maintaining optical fiber of the separate pair of polarization-maintaining optical fibers.

9. The optical data communication system as recited in claim 1, wherein the plurality of sections of polarization-maintaining optical fiber includes a third section optically connected to the second section through a second mechanical transfer connector.

10. The optical data communication system as recited in claim 9, wherein the third section has a third length that is about twice the second length of the second section.

11. The optical data communication system as recited in claim 9, wherein the third section has a third length that is at least three times longer than the second length of the second section.

12. The optical data communication system as recited in claim 9, wherein the third section has a third length that is greater than the second length of the second section.

13. The optical data communication system as recited in claim 12, wherein the plurality of sections of polarization-maintaining optical fiber includes a fourth section optically connected to the third section through a third mechanical transfer connector.

14. The optical data communication system as recited in claim 13, wherein the fourth section has a fourth length that is substantially equal to the second length of the second section.

15. The optical data communication system as recited in claim 14, wherein the plurality of sections of polarization-maintaining optical fiber includes a fifth section optically connected to the fourth section through a fourth mechanical transfer connector.

16. The optical data communication system as recited in claim 15, wherein the fifth section has a fifth length that is substantially equal to the first length of the first section.

17. The optical data communication system as recited in claim 16, wherein a first end of the first section is optically connected to an optical output of the optical transmitter, wherein a second end of the first section is optically connected to the first mechanical transfer connector, wherein a first end of the fifth section is optically connected to the fourth mechanical transfer connector, and wherein a second end of the fifth section is optically connected to an optical input of the optical receiver.

18. The optical data communication system as recited in claim 17, wherein one or more of the first section, the second section, the third section, the fourth section, and the fifth section includes a polarizer that suppresses one of two polarization modes.

19. The optical data communication system as recited in claim 17, wherein the first section includes a first polarizer that suppresses a first polarization mode of two polarization modes, wherein the second section includes a second polarizer that suppresses the first polarization mode, wherein the third section includes a third polarizer that suppresses the first polarization mode, wherein the fourth section includes a fourth polarizer that suppresses the first polarization mode, and wherein the fifth section includes a fifth polarizer that suppresses the first polarization mode.

* * * * *